United States Patent [19]

Downey

[11] 3,793,849
[45] Feb. 26, 1974

[54] SHAFT COUPLING AND ELEMENT THEREFOR
[76] Inventor: Holmes A. Downey, R.R. No. 3, Bremen, Ind.
[22] Filed: Nov. 4, 1971
[21] Appl. No.: 195,570

[52] U.S. Cl. .................. 64/13, 64/11, 64/27 NM
[51] Int. Cl. ............................................. F16d 3/78
[58] Field of Search ............. 64/13, 11, 6, 2, 27 NM

[56] References Cited
UNITED STATES PATENTS

| | | | |
|---|---|---|---|
| 2,702,087 | 2/1955 | Beier | 64/27 NM |
| 1,178,283 | 4/1916 | Winter | 64/6 |
| 2,468,985 | 5/1949 | Krotz | 64/27 NM |
| 2,499,093 | 2/1950 | Fast | 64/13 |
| 2,659,218 | 11/1953 | Riopelle | 64/13 |
| 3,316,737 | 5/1967 | Hulley | 64/13 |

Primary Examiner—Charles J. Myhre
Assistant Examiner—Randall Heald
Attorney, Agent, or Firm—Marmaduke A. Hobbs

[57] ABSTRACT

A flexible coupling for connecting two shafts in end to end relation in which there are flanges for each of the shafts, a plurality of spaced pins secured in each of said flanges and projecting toward the other flange, and a flexible element of elastomeric material disposed between the flanges and having holes for receiving and gripping the pins of each of the two flanges. The flexible element, which is preferably constructed of polyurethane, contains bosses around each of the holes and an intervening area of lesser thickness for improved flexibility between the holes. Spacer protrusions are provided on opposite sides of the element for positioning the element between the two flanges.

14 Claims, 6 Drawing Figures

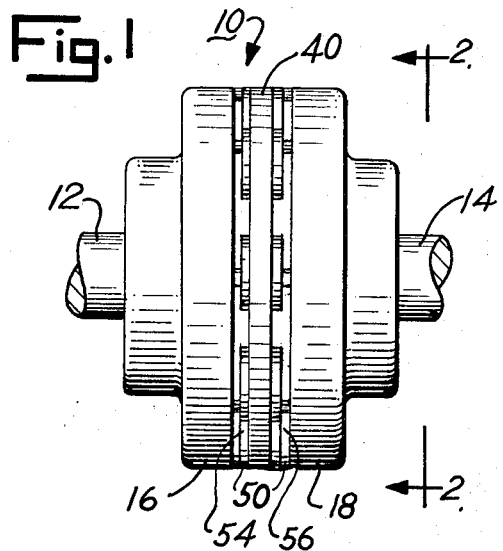
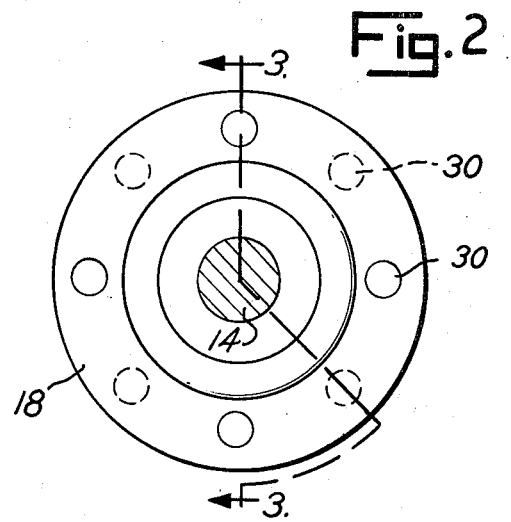
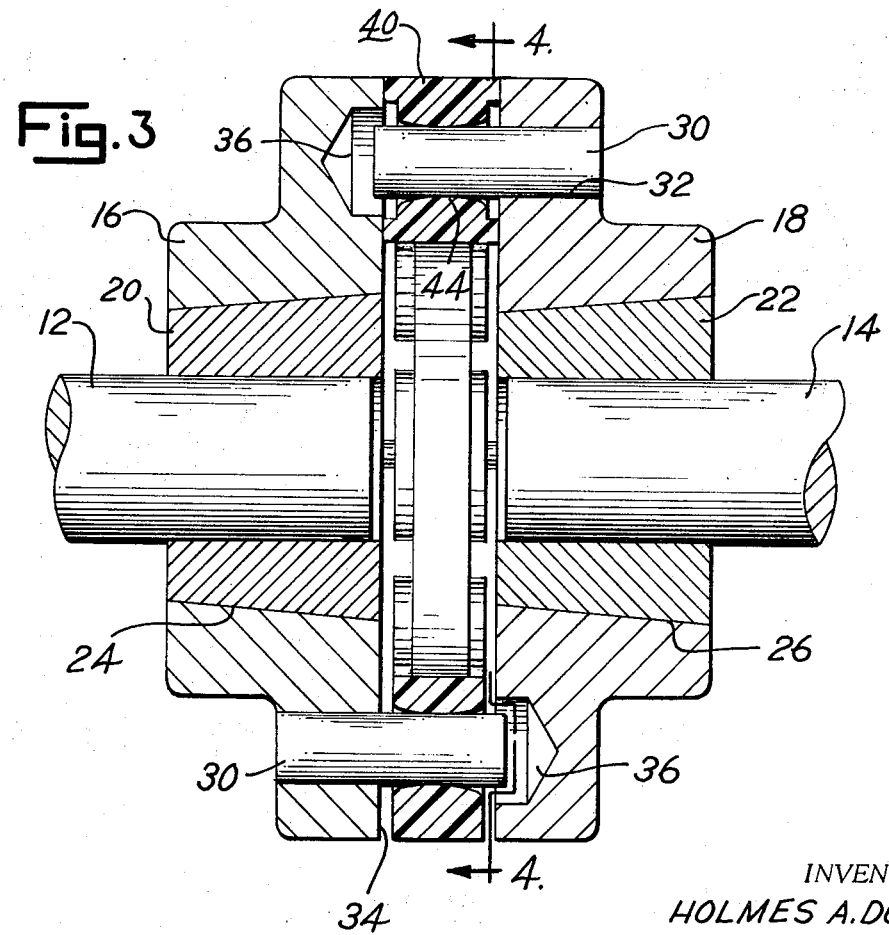
INVENTOR.
HOLMES A. DOWNEY
BY Hobbs & Green
ATTORNEYS

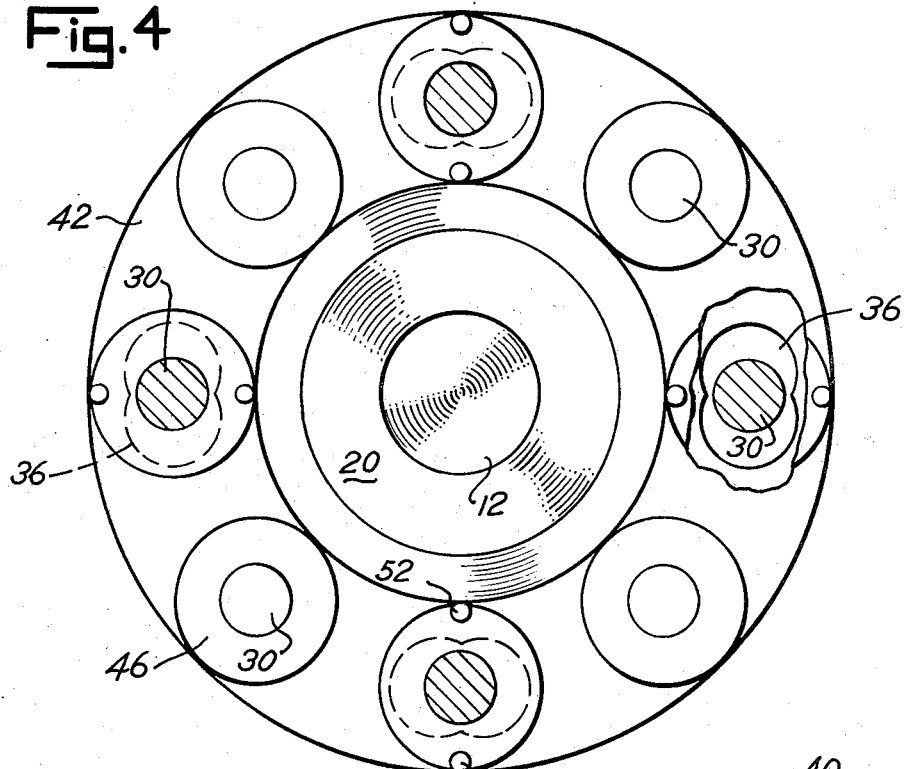
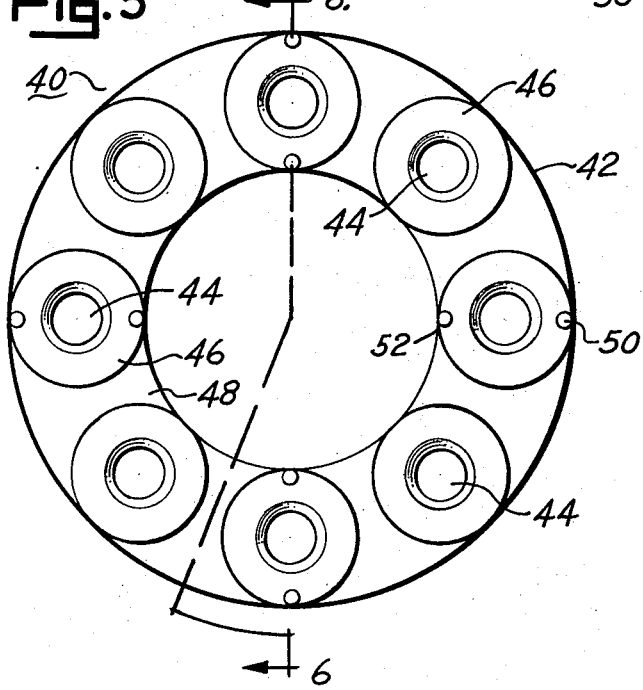
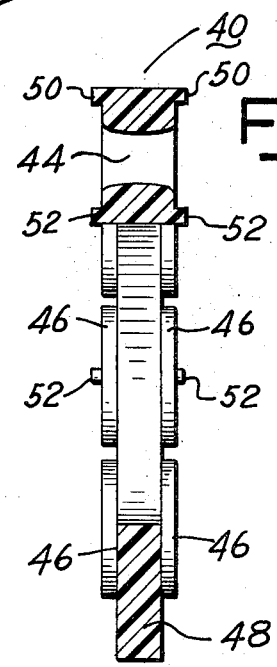

SHAFT COUPLING AND ELEMENT THEREFOR

Many flexible couplings use mechanical clearance between the coupling parts to provide the latitude necessary to operate the unit in other than a perfectly aligned mode. The consequent abrasion and wear of these parts as they move relative to one another not only shorten the life of the coupling parts but may induce undesirable system effects such as vibration and particle contamination of the surrounding area.

A common type of coupling for connecting two rotating shafts in end to end relation consists of a pair of flanges for the shaft with alternate pins extending lengthwise of the shafts, and a flexible disc disposed between the flanges and containing holes for receiving the alternately positioned pins. In the past the flexible discs were made of fiber reinforced rubber material which were sufficiently flexible and the parts fitting sufficiently loosely to permit acceptable operation of the two shafts even though they may have had appreciable shaft misalignment. These prior discs initially did not fit tight on the pins, and hence substantial wear, principally by rubbing and abrasion, occurred on the pins and in the element holes, which accelerated as the wear progressed so that replacement of the element, the pins or entire coupling often became necessary in a relatively short period of time. With the occurrence of wear on the pins and in the holes of the element, consistent and dependable performance of the coupling was not possible over long periods of time. It is therefore one of the principal objects of the present invention to provide a coupling of the aforementioned type which contains an element so designed and constructed that little or no rubbing action, abrasion or wear takes place between the pins and the element and friction and wear are reduced to a minimum.

Another object of the invention is to provide a shaft coupling having a pair of flanges with alternately arranged pins and an element disposed between the flanges for holding the pins and flanges in a predetermined relationship, yet providing sufficient flexibility in the coupling to permit it to adjust effectively and efficiently to all normal misalignments between the shafts connected thereby.

Still another object of the invention is to provide an element for a flexible coupling which can be readily tailor made to any particular installation, and which has better performance and longer life than the present fiber reinforced rubber elements, and which gives optimum flexibility to the coupling without producing any significant friction or wear in the various operating parts.

A further object is to provide an element for a flexible coupling which is simple in construction and operation, and which can readily and consistently be fabricated using standard know-how and equipment.

The present invention embodies an elastomeric flexible coupling element, designed to utilize the elastomeric properties of flexure and the elastic characteristics unique to these materials under tensile and compression forces, capable of transmitting a torsional moment and simultaneously accepting distortion or system misalignment of the coupling without relative movement of the coupling parts with respect to one another. Wear of the coupling's parts is negligible and degradation is confined to the internal structure of the flexible element. The torque transmission through the coupling is accomplished by axially arranged pins disposed in a circle and projecting from the face of the shaft flanges attached rigidly to the shaft. The pins are alternatingly engaged and the elastomeric element fits snugly over each pin. Application of a torsional moment to one shaft causes rotation of the rigidly attached flange and thus causes the axially disposed pins to bear on the element material. By virtue of the imposed compression and tension forces created in the element, the alternately disposed pins of the opposite flange are driven, and the torque consequently imposed on the driven shaft through the opposite flange.

An additional feature of the present elastomeric element is the axial projections from the faces of the element. The action of these projections during coupling operation prevents axial travel of the element on the flange pins, thereby maintaining the element in the geometric center of the coupling even during asymmetric misalignments. Maintaining the central location prevents the element from working against the face of either flange and restricting the freedom of movement of the elastomer. Should the elastomer not be free to flex and follow the movement of the pins, a sliding action is generated between the element and pins which wears the elastomeric material and reduces or eliminates the action of retention of the element on the pin, permitting sliding friction wear to eventually destroy the usefulness of the coupling. An added advantage of the projections is their function during coupling installation. The coupling flanges may be brought together until they touch the projections, thus eliminating any requirement for further axial measurements.

The invention will be more fully understood and additional objects and advantages will become apparent from the following description and accompanying drawings, wherein:

FIG. 1 is a side elevational view of a coupling embodying the present invention;

FIG. 2 is an end elevational view of the coupling shown in FIG. 1;

FIG. 3 is an enlarged cross-sectional view of the coupling shown in FIGS. 1 and 2, the section being taken on line 3—3 of FIG. 2;

FIG. 4 is a transverse, cross-sectional view of the coupling, the section being taken on line 4—4 of FIG. 3;

FIG. 5 is an elevational view of the flexible element forming a part of the coupling shown in the preceding figures; and FIG. 6 is a cross-sectional view of the element shown in FIG. 5, the section being taken on line 6—6 of the latter figure.

Referring more specifically to the drawings, numeral 10 indicates generally a coupling embodying the present invention, showing the coupling mounted on two axially aligned, rotatable shafts 12 and 14. Various means of securing the coupling to the shaft may be used so long as the coupling is held rigidly in place on the two shafts for rotation therewith.

The coupling includes flanges 16 and 18, each flange being secured to the respective shafts 12 and 14 by tapered bushings 20 and 22, respectively, seated in tapered bores 24 and 26. Screws of a well-known structural relationship with the flanges, force the bushings into the tapered bores, thereby contracting the split bushings around the shaft and holding the flanges firmly thereon; however, other types of flange securing means may be used if desired. The flanges contain alternately positioned pins 30 rigidly secured in bores 32 of the respective flange, and projecting axially parallel from the inner face 34 of each flange into a recess 36 of somewhat larger size than the diameter of the pin in the other flange. Each of the two flanges contains four equally spaced pins 30, and since the ends of the pins extend into the recesses 36, the pins of the flange on the driving shaft are capable of driving the flange on the driven shaft by engagement of the ends of the pins with the sides of the respective recesses 36, thus providing a positive mechanical connection between the two flanges in the event they are subjected to excessive amount of torque, or in the event the torsion element fails or is severely damaged. The recesses 36 also permit sufficient movement between the two flanges that the flexible element can perform functionally without interference between the pins of one flange and the opposed flange.

The torsional element, which is indicated generally by numeral 40, consists of an elastomeric body 42, preferably of polyurethane or other suitable plastic material, having sufficient flexibility to permit the element to adapt to parallel and angular misalignment of the two shafts. The body of the flexible element contains a plurality of holes 44, each having an annular boss 46 disposed therearound and formed integrally with the body 42, thus providing, in effect, an intervening thin portion 48 which is capable of flexing sufficiently to permit the element to adapt to the various misalignments of the two shafts without requiring movement of the element on the pins. Before the element is assembled, the holes 44 are somewhat smaller in diameter than the pins so that expansion of the body material surrounding the holes is required in assembling the element on the pins, thereby causing the sides of the holes to firmly grip the pins and prevent any appreciable relative movement therebetween.

In order to assure adequate clearance between the two flanges 16 and 18 and element 40 during the operation of the coupling, and to assist in assembling the flanges on the two shafts in proper relationship to one another, the element 40 contains a plurality of pin-like projections 50 and 52 projecting outwardly from annular boss 46, at the inner and outer edges thereof, on those disposed at right angles to one another, i.e. every other boss. The two projections are also disposed on the corresponding opposite sides of the element. When the coupling is assembled on the shafts, the two flanges are positioned with the inner face 34 thereof seated against the outer end of projections 50 and 52, thereby providing the desired space 54 and 56 between flanges 16 and 18 and the respective sides of element 40, with the spacing 54 and 56 being provided by the projections. Adequate space for flexing of the element without interference from the flanges is assured, and the required space is consistently obtained from one installation to another by the projections in the manner described.

In the use and operation of the shaft coupling involving the present invention, the two flanges 16 and 18 are mounted on shafts 12 and 14 and element 40 is inserted therebetween with the four pins of each flange being pushed forcefully through holes 44 in the element. Since the holes are somewhat smaller than the pins, substantial force is required to assemble the element between the flanges. The flanges are pressed toward one another until the inner face 34 of each flange abuts against the ends of projections 50 and 52, thus providing the desired spaces 54 and 56 between the two flanges and the element. With the element assembled on the shafts 12 and 14 in the foregoing manner, the flanges are secured firmly to the shafts. When the flanges are spaced from one another by the element and the projections thereon, the ends of pins 30 extend into recesses 36. As the coupling operates, the driving shaft 12, for example, transmits torque through flange 16 to the four alternately spaced pins in the flange to element 40, which in turn transmits the force therefrom to pins 30 in flange 18 and thence to driven shaft 14. Any parallel or angular misalignment between the shafts is effectively absorbed by the element, particularly by the relatively thin portions 48 between annular bosses 46, which are capable of substantial flexing without causing any relative movement between the element and pins. These thin portions 48 can be varied in thickness to provide the desired characteristic in the coupling for any normal operating condition.

The snug and gripping fit between pins 30 and holes 44 virtually eliminates any rubbing and abrasive action between the pins and the coupling, thereby substantially increasing the life of both the element and the pins, and hence extending the life of the principal coupling parts. In the event the element 40 fails, the coupling may continue to operate effectively for a period of time by the interlocking relationship of the ends of pins 30 and the walls of recesses 36. The size of the recesses with relation to the pins also determines the maximum deflection which may occur between flanges 16 and 18 and the flexible element 40.

While only one embodiment of the present shaft coupling and element therefor has been described in detail herein, various changes and modifications may be made without departing from the scope of the invention.

I claim:

1. A flexible coupling for connecting two shafts in an end relation, comprising a flange having a center bore for each of said shafts, a plurality of spaced pins secured in each of said flanges and projecting toward the other flange, and a flexible element of resilient, relatively rigid plastic material disposed between said flanges and having holes receiving and gripping the pins of each of said flanges, said holes having outwardly flaring ends and being initially smaller in cross section near the center of the element than the diameter of said pins in said holes to cause the walls of the holes to grip the pins more firmly near the center of the element holes than near the outside edges thereof.

2. A flexible coupling as defined in claim 1 in which said elastomeric material is polyurethane.

3. A flexible coupling as defined in claim 1 in which an annular boss surrounds each of said holes at the two ends thereof.

4. A flexible coupling as defined in claim 1 in which projections are provided on opposite sides of said element for spacing said element from the two flanges.

5. A flexible coupling as defined in claim 3 in which projections are provided on opposite sides of said element for spacing said element from the two flanges.

6. A flexible coupling as defined in claim 1 in which the material between said holes is thinner than the material immediately surrounding said holes to provide an area of increased flexibility located intermediately of said holes.

7. A flexible coupling as defined in claim 1 in which the pins of one of said flanges are positioned alternately with respect to the pins of the other flange.

8. A flexible coupling as defined in claim 7 in which the other of said flanges contains a recess for loosely receiving the end of the respective pin which projects thereinto.

9. A flexible element for a coupling having two flanges with a plurality of axially parallel pins for connecting two shafts in end to end relation, comprising a flexible annular member composed of resilient, relatively rigid plastic material and having a plurality of spaced holes therein corresponding to the number of pins in both of the flanges for receiving and gripping said pins, said holes having outwardly flaring ends and being initially smaller in cross section near the center of the element than the diameter of said pins in said holes to cause the walls of the holes to grip the pins more firmly near the center of the element holes than near the outside edges thereof.

10. A flexible element for a shaft coupling as defined in claim 9 in which said elastomeric material is polyurethane.

11. A flexible element for a shaft coupling as defined in claim 9 in which an annular boss surrounds each of said holes at the two ends thereof.

12. A flexible element for a shaft coupling as defined in claim 9 in which projections are provided on opposite sides of said element for spacing said element from the two flanges.

13. A flexible element for a shaft coupling as defined in claim 11 in which spacer projections are provided on opposite sides of said element for spacing said element from the two flanges.

14. A flexible element for a shaft coupling as defined in claim 9 in which the material between said holes is thinner than the material immediately surrounding said holes to provide an area of increased flexibility intermediately of said holes.

\* \* \* \* \*